(12) United States Patent
Holden et al.

(10) Patent No.: US 10,935,382 B2
(45) Date of Patent: *Mar. 2, 2021

(54) DYNAMICALLY PROVIDING POSITION INFORMATION OF A TRANSIT OBJECT TO A COMPUTING DEVICE

(71) Applicant: Uber Technologies, Inc., San Francisco, CA (US)

(72) Inventors: Paul-Phillip Holden, San Francisco, CA (US); Matthew Sweeney, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/247,958

(22) Filed: Jan. 15, 2019

(65) Prior Publication Data
US 2019/0145782 A1    May 16, 2019

Related U.S. Application Data

(63) Continuation of application No. 15/596,944, filed on May 16, 2017, now Pat. No. 10,180,330, which is a
(Continued)

(51) Int. Cl.
*G01C 21/30* (2006.01)
*H04W 4/024* (2018.01)
(Continued)

(52) U.S. Cl.
CPC .............. *G01C 21/30* (2013.01); *G01S 19/39* (2013.01); *G06F 21/552* (2013.01);
(Continued)

(58) Field of Classification Search
USPC ........................................................ 701/420
See application file for complete search history.

(56) References Cited

U.S. PATENT DOCUMENTS 3,953,720 A    4/1976 Kelch
5,828,979 A *  10/1998 Polivka ............... B61L 27/0016
                                                701/117
(Continued)

FOREIGN PATENT DOCUMENTS

CN        1800783 A     7/2006
CN      101136140 A     3/2008
(Continued)

OTHER PUBLICATIONS

"Uber iPhone app update 1.0.48", Jun. 27, 2011, http://blog.uber.com/2011/06/27/uber-iphone-app-update-1-0-48/.
(Continued)

*Primary Examiner* — Jean Paul Cass
(74) *Attorney, Agent, or Firm* — Fenwick & West LLP

(57) ABSTRACT

A system and method for providing position information of a transit object to a computing device is provided. Global positioning satellite (GPS) information of a transit object can be periodically received. For each of some of the GPS information, one or more candidate points of a transit system can be identified based on the GPS information. Using the one or more candidate points, a most likely path of travel can be determined. Additional position points along the most likely path of travel can be extrapolated and transmitted to a computing device.

20 Claims, 8 Drawing Sheets

Related U.S. Application Data continuation of application No. 13/672,643, filed on Nov. 8, 2012, now Pat. No. 9,671,233.

(51) Int. Cl.
| | |
|---|---|
| *H04W 4/40* | (2018.01) |
| *G01S 19/39* | (2010.01) |
| *G06Q 10/08* | (2012.01) |
| *G08G 1/13* | (2006.01) |
| *G08G 1/00* | (2006.01) |
| *G06F 21/55* | (2013.01) |
| *H04W 4/44* | (2018.01) |
| *H04W 4/029* | (2018.01) |

(52) U.S. Cl.
CPC ........... *G06Q 10/0833* (2013.01); *G08G 1/13* (2013.01); *G08G 1/205* (2013.01); *H04W 4/024* (2018.02); *H04W 4/40* (2018.02); *H04W 4/44* (2018.02); *G06F 2221/2111* (2013.01); *G06F 2221/2115* (2013.01); *H04W 4/029* (2018.02)

(56) References Cited

U.S. PATENT DOCUMENTS

| | | | |
|---|---|---|---|
| 5,862,244 A | 1/1999 | Kleiner et al. | |
| 5,930,474 A | 7/1999 | Dunworth et al. | |
| 6,002,981 A | 12/1999 | Kreft | |
| 6,179,252 B1* | 1/2001 | Roop | B61L 29/18 246/122 R |
| 6,184,802 B1* | 2/2001 | Lamb | G08G 1/123 340/988 |
| 6,236,933 B1* | 5/2001 | Lang | G08G 1/0104 340/905 |
| 6,243,657 B1* | 6/2001 | Tuck | G01N 29/2412 702/150 |
| 6,356,838 B1 | 3/2002 | Paul | |
| 6,401,034 B1* | 6/2002 | Kaplan | G01C 21/3476 340/988 |
| 6,417,856 B1 | 7/2002 | Tamura et al. | |
| 6,421,587 B2* | 7/2002 | Diana | B61L 25/023 246/122 R |
| 6,456,207 B1 | 9/2002 | Yen | |
| 6,484,094 B1* | 11/2002 | Wako | G01C 21/3617 340/988 |
| 6,516,056 B1 | 2/2003 | Justice et al. | |
| 6,519,463 B2 | 2/2003 | Tendler | |
| 6,631,322 B1* | 10/2003 | Arthur | B61L 27/0027 340/991 |
| 6,697,730 B2 | 2/2004 | Dickerson | |
| 6,756,913 B1 | 6/2004 | Ayed | |
| 7,009,501 B2* | 3/2006 | Olch | H04B 10/1149 180/167 |
| 7,064,681 B2 | 6/2006 | Horstemeyer | |
| 7,089,110 B2 | 8/2006 | Pechatnikov et al. | |
| 7,113,110 B2 | 9/2006 | Horstemeyer | |
| 7,119,716 B2 | 10/2006 | Horstemeyer | |
| 7,143,241 B2* | 11/2006 | Hull | H04L 67/18 711/133 |
| 7,191,057 B2 | 3/2007 | Adamczyk | |
| 7,315,780 B2 | 1/2008 | Sugahara et al. | |
| 7,319,414 B2 | 1/2008 | Horstemeyer | |
| 7,394,386 B2 | 7/2008 | Nowlan | |
| 7,412,042 B2 | 8/2008 | Henry | |
| 7,421,334 B2* | 9/2008 | Dahlgren | G07C 5/008 340/989 |
| 7,434,177 B1 | 10/2008 | Ording et al. | |
| 7,479,899 B2 | 1/2009 | Horstemeyer | |
| 7,479,900 B2 | 1/2009 | Horstemeyer | |
| 7,479,901 B2 | 1/2009 | Horstemeyer | |
| 7,482,952 B2 | 1/2009 | Horstemeyer | |
| 7,487,467 B1 | 2/2009 | Kawahara et al. | |
| 7,504,966 B2 | 3/2009 | Horstemeyer | |
| 7,525,427 B2* | 4/2009 | Mauriello | G07C 5/085 340/438 |
| 7,528,742 B2 | 5/2009 | Horstemeyer | |
| 7,538,691 B2 | 5/2009 | Horstemeyer | |
| 7,552,063 B1 | 6/2009 | McEachern | |
| 7,561,069 B2 | 7/2009 | Horstemeyer | |
| 7,590,490 B2* | 9/2009 | Clark | G01C 21/3415 340/994 |
| 7,692,655 B2* | 4/2010 | Ni | G01C 21/3673 345/442 |
| 7,698,450 B2* | 4/2010 | Monroe | H04N 7/181 709/218 |
| 7,714,705 B2* | 5/2010 | Rennie | G08G 1/017 340/426.16 |
| 7,720,581 B2* | 5/2010 | Yaqub | G08G 1/20 701/32.3 |
| 7,733,371 B1* | 6/2010 | Monroe | G08B 13/19628 348/143 |
| 7,876,239 B2 | 1/2011 | Horstemeyer | |
| 7,957,871 B1* | 6/2011 | Echeruo | G01C 21/3626 104/27 |
| 7,957,891 B2* | 6/2011 | Okuyama | B63H 21/22 301/71 |
| 8,050,688 B2* | 11/2011 | Jacob | G06Q 20/32 455/456.1 |
| 8,068,037 B2 | 11/2011 | Horstemeyer | |
| 8,099,085 B2 | 1/2012 | Lowry | |
| 8,188,745 B2* | 5/2012 | Overby | G01V 3/12 324/326 |
| 8,232,899 B2 | 7/2012 | Horstemeyer | |
| 8,242,935 B2 | 8/2012 | Horstemeyer | |
| 8,271,316 B2 | 9/2012 | Blackshaw et al. | |
| 8,284,076 B1 | 10/2012 | Horstemeyer | |
| 8,362,927 B2 | 1/2013 | Horstemeyer | |
| 8,368,562 B2 | 2/2013 | Horstemeyer | |
| 8,374,627 B2 | 2/2013 | Howard et al. | |
| 8,473,203 B2* | 6/2013 | Shin | G01C 21/30 701/446 |
| 8,531,317 B2 | 9/2013 | Horstemeyer | |
| 8,564,459 B2 | 10/2013 | Horstemeyer | |
| 9,230,292 B2 | 1/2016 | Amin et al. | |
| 9,671,233 B2* | 6/2017 | Holden | G01C 21/30 |
| 2002/0034292 A1 | 3/2002 | Tuoriniemi et al. | |
| 2002/0077905 A1 | 6/2002 | Arndt et al. | |
| 2002/0095326 A1 | 7/2002 | Katz | |
| 2002/0138338 A1 | 9/2002 | Trauth et al. | |
| 2002/0194129 A1 | 12/2002 | Furuya et al. | |
| 2003/0040944 A1 | 2/2003 | Hileman | |
| 2003/0043206 A1 | 3/2003 | Duarte | |
| 2003/0087648 A1 | 5/2003 | Mezhvinsky et al. | |
| 2003/0137435 A1 | 7/2003 | Haddad et al. | |
| 2004/0054428 A1 | 3/2004 | Sheha et al. | |
| 2004/0093280 A1 | 5/2004 | Yamaguchi | |
| 2004/0100479 A1 | 5/2004 | Nakano et al. | |
| 2004/0106399 A1 | 6/2004 | Ki | |
| 2004/0112959 A1 | 6/2004 | Jun | |
| 2004/0155907 A1 | 8/2004 | Yamaguchi et al. | |
| 2004/0185842 A1 | 9/2004 | Spaur et al. | |
| 2004/0219933 A1 | 11/2004 | Faith | |
| 2004/0243430 A1 | 12/2004 | Horstemeyer | |
| 2004/0254717 A1 | 12/2004 | Sugahara et al. | |
| 2004/0254811 A1 | 12/2004 | Horstemeyer | |
| 2005/0091596 A1 | 4/2005 | Anthony et al. | |
| 2005/0143095 A1* | 6/2005 | Jacob | H04W 4/029 455/456.3 |
| 2005/0149382 A1 | 7/2005 | Fenner et al. | |
| 2005/0278114 A1 | 12/2005 | Ahmad | |
| 2006/0034201 A1 | 2/2006 | Umeda et al. | |
| 2006/0048076 A1 | 3/2006 | Vronay et al. | |
| 2006/0059023 A1 | 3/2006 | Mashinsky | |
| 2006/0094447 A1 | 5/2006 | Zellner | |
| 2006/0135134 A1 | 6/2006 | Mezhvinsky et al. | |
| 2006/0136254 A1 | 6/2006 | Greenstein | |
| 2006/0149681 A1 | 7/2006 | Meisner | |
| 2006/0161346 A1 | 7/2006 | Murakami et al. | |
| 2006/0200306 A1 | 9/2006 | Adamcyzk | |
| 2006/0217885 A1 | 9/2006 | Crady et al. | |
| 2006/0229778 A1 | 10/2006 | Obradovich et al. | |

(56) References Cited

U.S. PATENT DOCUMENTS

| | | | |
|---|---|---|---|
| 2006/0268100 A1 | 11/2006 | Karukka et al. | |
| 2006/0271867 A1 | 11/2006 | Wang et al. | |
| 2007/0073477 A1 | 3/2007 | Krumm et al. | |
| 2007/0176796 A1 | 8/2007 | Bliss et al. | |
| 2007/0198276 A1 | 8/2007 | Hinrichs et al. | |
| 2008/0076451 A1 | 3/2008 | Sheha et al. | |
| 2008/0114629 A1 | 5/2008 | Pavlov | |
| 2008/0172173 A1 | 7/2008 | Chang et al. | |
| 2008/0178116 A1 | 7/2008 | Kim | |
| 2008/0189207 A1 | 8/2008 | Wurster | |
| 2008/0195428 A1 | 8/2008 | O'Sullivan | |
| 2008/0288880 A1 | 11/2008 | Reponen et al. | |
| 2008/0307512 A1 | 12/2008 | Tandon | |
| 2009/0030885 A1 | 1/2009 | DePasquale et al. | |
| 2009/0049119 A1 | 2/2009 | Marcinkiewicz et al. | |
| 2009/0083111 A1 | 3/2009 | Carr | |
| 2009/0099971 A1 | 4/2009 | Salemme et al. | |
| 2009/0106124 A1 | 4/2009 | Yang | |
| 2009/0138199 A1* | 5/2009 | Bonanni | G01S 19/50 701/472 |
| 2009/0156241 A1 | 6/2009 | Staffaroni et al. | |
| 2009/0157566 A1 | 6/2009 | Grush | |
| 2009/0171576 A1 | 7/2009 | Kim et al. | |
| 2009/0172599 A1 | 7/2009 | Nezu | |
| 2009/0176508 A1 | 7/2009 | Lubeck et al. | |
| 2009/0177384 A1 | 7/2009 | Walder | |
| 2009/0177385 A1 | 7/2009 | Matas et al. | |
| 2009/0177502 A1 | 7/2009 | Doinoff et al. | |
| 2009/0192851 A1 | 7/2009 | Bishop | |
| 2009/0204920 A1 | 8/2009 | Beverley et al. | |
| 2009/0216600 A1 | 8/2009 | Hill | |
| 2009/0222284 A1 | 9/2009 | McEachern | |
| 2009/0234523 A1 | 9/2009 | Nandedkar et al. | |
| 2009/0254270 A1 | 10/2009 | Yu | |
| 2009/0282353 A1 | 11/2009 | Halbherr et al. | |
| 2009/0313077 A1 | 12/2009 | Wheeler | |
| 2009/0326991 A1 | 12/2009 | Wei et al. | |
| 2010/0035596 A1 | 2/2010 | Nachman et al. | |
| 2010/0042549 A1 | 2/2010 | Adamczyk et al. | |
| 2010/0070334 A1 | 3/2010 | Monteverde | |
| 2010/0076878 A1 | 3/2010 | Burr et al. | |
| 2010/0076988 A1 | 3/2010 | Kenedy et al. | |
| 2010/0088026 A1 | 4/2010 | Manolescu | |
| 2010/0109948 A1 | 5/2010 | Razoumov et al. | |
| 2010/0114475 A1* | 5/2010 | Shin | G01C 21/30 701/533 |
| 2010/0115455 A1 | 5/2010 | Kim | |
| 2010/0121689 A1 | 5/2010 | Wallace et al. | |
| 2010/0141261 A1* | 6/2010 | Overby | G01V 3/12 324/329 |
| 2010/0153292 A1 | 6/2010 | Zheng et al. | |
| 2010/0198453 A1 | 8/2010 | Dorogusker et al. | |
| 2010/0228415 A1 | 9/2010 | Paul | |
| 2010/0235085 A1 | 9/2010 | Kikuchi | |
| 2011/0010300 A1 | 1/2011 | Audet | |
| 2011/0052110 A1 | 3/2011 | Kim | |
| 2011/0060480 A1 | 3/2011 | Mottla et al. | |
| 2011/0060600 A1 | 3/2011 | Fox et al. | |
| 2011/0069017 A1 | 3/2011 | Victor | |
| 2011/0099040 A1 | 4/2011 | Felt et al. | |
| 2011/0137696 A1 | 6/2011 | Meyer et al. | |
| 2011/0153192 A1 | 6/2011 | Lin | |
| 2011/0197131 A1 | 8/2011 | Duffin et al. | |
| 2011/0208732 A1 | 8/2011 | Melton et al. | |
| 2011/0218992 A1 | 9/2011 | Waldman et al. | |
| 2011/0221765 A1 | 9/2011 | Nason et al. | |
| 2011/0307282 A1 | 12/2011 | Camp et al. | |
| 2011/0313880 A1 | 12/2011 | Paul et al. | |
| 2012/0084676 A1 | 4/2012 | de Paz | |
| 2012/0130627 A1 | 5/2012 | Islam et al. | |
| 2012/0163662 A1* | 6/2012 | Lee | G06K 9/00651 382/103 |
| 2012/0179764 A1 | 7/2012 | Erdal | |
| 2012/0203599 A1 | 8/2012 | Choi et al. | |
| 2012/0225671 A1 | 9/2012 | Lubeck et al. | |
| 2012/0232800 A1* | 9/2012 | Overby | G01V 3/12 702/7 |
| 2012/0232943 A1 | 9/2012 | Myr | |
| 2012/0239452 A1 | 9/2012 | Trivedi et al. | |
| 2012/0323642 A1 | 12/2012 | Camp et al. | |
| 2012/0327009 A1 | 12/2012 | Fleizach | |
| 2013/0024249 A1 | 1/2013 | Zohar et al. | |
| 2013/0041720 A1 | 2/2013 | Spires | |
| 2013/0132140 A1 | 5/2013 | Amin et al. | |
| 2013/0132246 A1 | 5/2013 | Amin et al. | |
| 2013/0132887 A1 | 5/2013 | Amin et al. | |
| 2013/0162627 A1 | 6/2013 | Gabara | |
| 2013/0185123 A1 | 7/2013 | Krivopaltsev et al. | |
| 2013/0185124 A1 | 7/2013 | Aaron et al. | |
| 2013/0191141 A1 | 7/2013 | Chun et al. | |
| 2013/0204676 A1 | 8/2013 | Hindi et al. | |
| 2013/0219429 A1* | 8/2013 | Hirsch | H04N 21/485 725/37 |
| 2013/0268406 A1 | 10/2013 | Radhakrishnan et al. | |
| 2013/0290040 A1 | 10/2013 | Perry et al. | |
| 2014/0026065 A1 | 1/2014 | Wang | |
| 2014/0047346 A1 | 2/2014 | Karamchedu | |
| 2014/0051465 A1 | 2/2014 | Ruys et al. | |
| 2014/0067491 A1 | 3/2014 | James et al. | |
| 2014/0129135 A1 | 5/2014 | Holden et al. | |
| 2014/0129302 A1 | 5/2014 | Amin et al. | |
| 2014/0136414 A1* | 5/2014 | Abhyanker | G05D 1/024 705/44 |
| 2014/0172727 A1 | 6/2014 | Abhyanker et al. | |
| 2014/0180732 A1 | 6/2014 | Rotchin et al. | |
| 2014/0180733 A1 | 6/2014 | Rotchin et al. | |
| 2015/0012341 A1 | 1/2015 | Amin | |
| 2015/0046080 A1 | 2/2015 | Wesselius et al. | |

FOREIGN PATENT DOCUMENTS

| | | |
|---|---|---|
| JP | 2003-318613 A | 11/2000 |
| JP | 2002-024659 A | 1/2002 |
| JP | 2011-075345 A | 4/2011 |
| KR | 10-2005-0015772 A | 2/2005 |
| WO | WO 99/44186 A1 | 9/1999 |
| WO | WO 02/16457 A2 | 2/2008 |
| WO | WO 2008/145986 A2 | 12/2008 |

OTHER PUBLICATIONS

Alfred Round et al. "Futher Ride: Adapting New Technologies to Paratransit in the United States", Working Paper, UCTC No. 306, University of California Transportation Center, 51 pages.

Australian First Examination Report, Australian Application No. 2013341619, dated Apr. 11, 2018, 4 pages.

EESR dated May 31, 2016 in EP 13853974.7.

European Examination Report, European Application No. 13853974.7, dated Dec. 11, 2017, 6 pages.

Examination Report for Australian Application No. 2010325793, dated Jun. 21, 2013, 5 pages.

Final Office Action dated Feb. 26, 2014 for related U.S. Appl. No. 13/672,658.

Final office Action dated Jul. 10, 2013, for related U.S. Appl. No. 12/961,493, 44 pages.

Final Office Action dated Jun. 12, 2014, for related U.S. Appl. No. 12/928,253 19 pages.

Final Office Action for U.S. Appl. No. 12/928,254 dated Apr. 24, 2013, 15 pages.

Final Office Action for U.S. Appl. No. 13/596,497 dated May 16, 2013, 13 pages.

Goh, et al. Online map-matching based on Hidden Markov model for real-time traffic sensing applications, 2012, www.mit.edu/-jaillet/general/map_matching_itsc2012-final.pdf.

International Search Report and Written Opinion, International Application No. PCT/US2010/059152, dated Mar. 28, 2011, pp. 1-11.

International Search Report and Written Opinion, International Application No. PCT/US2013/68025, dated Apr. 15, 2014, pp. 12.

(56) References Cited

OTHER PUBLICATIONS

Krum, et al. Map Matching with Travel Time Constraints, 2006 SAE International.
Non-Final Office Action dated Aug. 16, 2012, for related U.S. Appl. No. 12/928,254, filed Dec. 6, 2010.
Non-Final Office Action dated Dec. 3, 2013 for related U.S. Appl. No. 13/672,661.
Non-Final Office Action dated Nov. 19, 2013, for related U.S. Appl. No. 12/928,253.
Non-Final Office Action dated Oct. 15, 2012, for related U.S. Appl. No. 13/596,497, filed Aug. 28, 2012.
Non-Final Office Action dated Oct. 5, 2012, for related U.S. Appl. No. 12/961,493, filed Dec. 6, 2010.
Non-Final Office Action dated Sep. 10, 2012, for related U.S. Appl. No. 12/928,253, filed Dec. 6, 2010.
Non-Final Office Action for U.S. Appl. No. 13/672,658 dated Jun. 12, 2013, 25 pages.
Office Action (Restriction Requirement) dated Jun. 6, 2012, for related U.S. Appl. No. 12/928,254, filed Dec. 6, 2010.
Office Action dated May 6, 2016 in CN 2013800581997.
PCT International Search Report and Written Opinion, PCT Application No. PCT/US13/66529, dated Jan. 17, 2014, 12 pages.
Search Report dated Apr. 25, 2016 in CN 2013800581997.
Search Report dated Oct. 1, 2013, for related EP Application No. 10835261.8.
Shigematsu et al. "AVM System", Fujistu Ten Technical Journal No. 33, 27:34, (2009).
United States Office Action, U.S. Appl. No. 13/672,643, dated Aug. 20, 2015, 19 pages.
United States Office Action, U.S. Appl. No. 13/672,643, dated Jun. 27, 2014, 67 pages.
United States Office Action, U.S. Appl. No. 13/672,643, dated Mar. 3, 2016, 22 pages.
United States Office Action, U.S. Appl. No. 13/672,643, dated Nov. 26, 2014, 127 pages.
United States Office Action, U.S. Appl. No. 13/672,643, dated Oct. 25, 2016, 29 pages.
United States Office Action, U.S. Appl. No. 15/596,944, dated Nov. 22, 2017, 26 pages.
European Patent Office, Summons to Attend Oral Proceedings, EP Patent Application No. 13853974.7, Jan. 3, 2020, eight pages.
Hu, K. et al., "Taxi-Viewer: Around the Corner Taxis Are!," 2010 Symposia and Workshops on Ubiquitous, Automatic and Trusted Computing, Oct. 26, 2010, pp. 498-500.

* cited by examiner

DYNAMICALLY PROVIDING POSITION INFORMATION OF A TRANSIT OBJECT TO A COMPUTING DEVICE

RELATED APPLICATIONS

This application is a continuation of U.S. patent application Ser. No. 15/596,944, filed May 16, 2017, now U.S. Pat. No. 10,180,330, which is a continuation of U.S. patent application Ser. No. 13/672,643, filed on Nov. 8, 2012, now U.S. Pat. No. 9,671,233. Each is incorporated by reference herein in its entirety.

This application is also related to U.S. Pat. No. 9,230,292, filed Nov. 8, 2012, entitled "Providing On-Demand Services Through Use Of Portable Computing Devices;" incorporated by reference in its entirety.

BACKGROUND

Current systems for visualizing the position of an object typically display the raw global positioning system (GPS) data of the object on a map. This GPS data is updated and then redisplayed to show the object's new position. In many situations, however, the raw GPS data does not provide an accurate depiction of the actual position and motion of the object.

DETAILED DESCRIPTION

Figure 1:
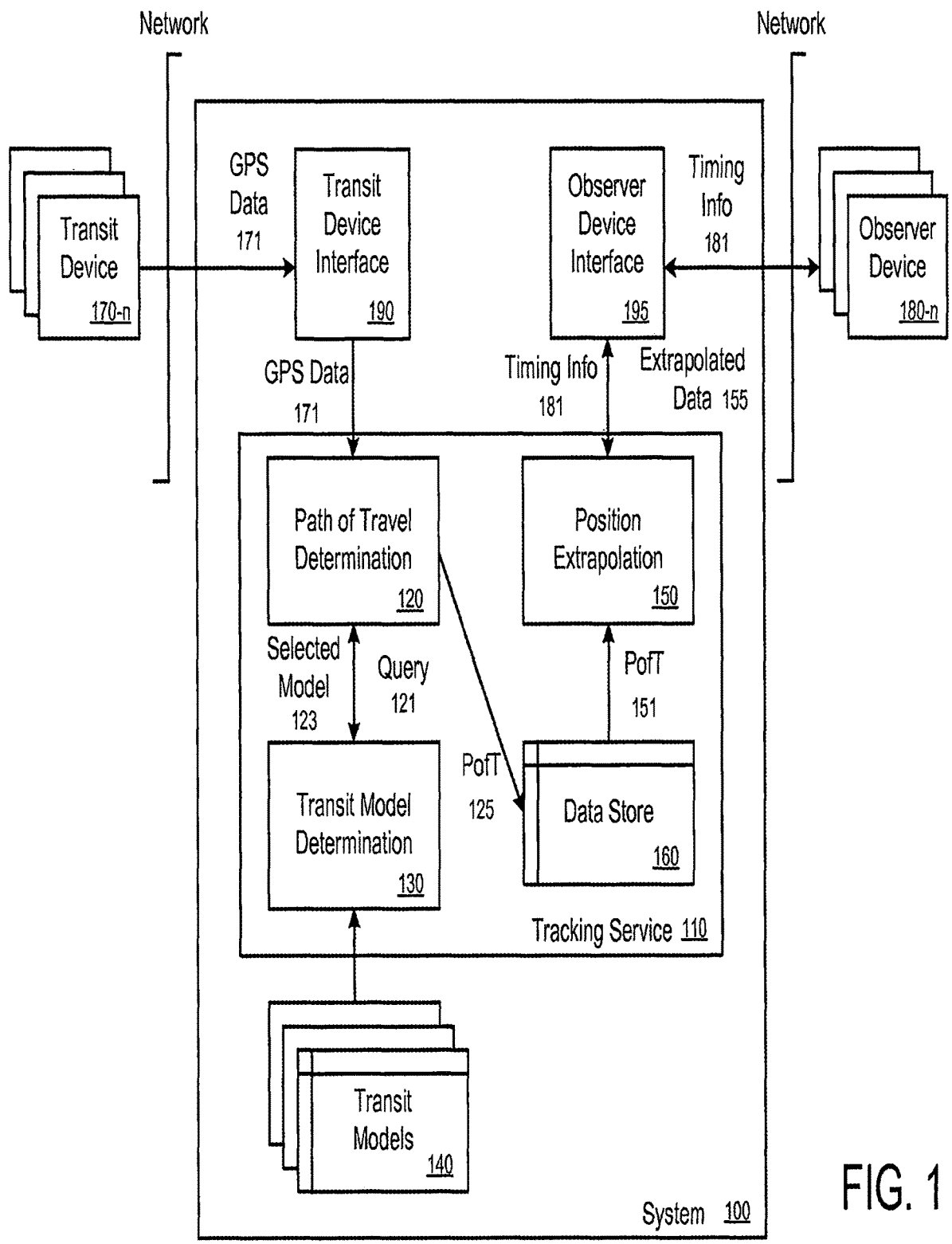
FIG. 1 illustrates an example tracking system, under an embodiment.

Embodiments described herein provide for a system that delivers real-time (or close to real-time) position and motion information of a transit object to a client application. The system can receive raw global positioning system (GPS) data from a transit device (e.g., a computing device) of a transit object (e.g., a vehicle, a bicycle, a train, etc.) as the transit object moves in position, and can use the data to determine a most likely path of travel of the transit object on an underlying transit system.

In some embodiments, a transit object's operator or driver can use a computing device (e.g., also referred to as a transit device) that can communicate GPS data corresponding its real-time position at a given instance in time to a system. In many cases, such GPS data may not be accurate due to GPS error and/or signal problems. Inaccurate location information of a transit object may be problematic, for example, to an end-user that is using the client application for requesting services.

By fitting the raw GPS data to an underlying transit system, the system can provide a more accurate depiction of the trajectory or movement of a transit object to an end user. A computing device (e.g., also referred to as an observer device) that runs a client application can receive position information of the most likely path of travel of the transit object and present a visualization of the trajectory of the transit object that accurately reflects the actual movement of the transit object to a user.

According to an embodiment, the system can periodically receive raw GPS data from one or more transit devices over a network. Because the position of a transit device corresponds to the position of the corresponding transit object, the GPS data of the transit device can identify the position of the transit object at an instance in time (e.g., a latitude, a longitude, an altitude, etc.). As the transit object moves in real-time, GPS data can be periodically provided to the system at different instances in time thereby providing updated position information indicating the movement of the transit object.

In some embodiments, for each received GPS point, the system can identify one or more candidate points of a transit system (e.g., roads, walkways, railways, shipping routes, flight paths, etc.) that can correspond to a possible position of the transit object for that GPS point. For example, a candidate point identified for a received GPS point can have a latitude and a longitude that is very close (e.g., within a certain distance) to that GPS point. The system can then use or apply one or more transit models in order to determine, for each transit object, the most likely path of travel on the transit system.

A transit device can be a computing device that runs an application configured to communicate with the system. Similarly, an observer device can run a client application also configured to communicate with the system and to present a visualization of the trajectory of the transit object. As described herein, a "transit device" and an "observer device" refer to computing devices that can correspond to desktop computers, cellular devices or smartphones, personal digital assistants (PDAs), laptop computers, tablet devices, television (IP Television), etc., that can provide network connectivity and processing resources for enabling a user to communicate with the system over a network. A transit device can also correspond to taxi meters, other metering devices of a transit object, or custom hardware, etc. Also as used herein, a "transit object" refers to an object that can be in motion, such as, for example, a vehicle (e.g., a sedan, an SUV, a limousine), a motorcycle, a bicycle, a train, a light-rail vehicle, an airplane, a helicopter, a ship, or a person (e.g., an individual walking, jogging, skateboarding).

Still further, the system, for example, can enable services (such as a transportation service, a delivery service, an entertainment service) to be arranged between individuals using a computing device (or observer device) and available service providers that provide services via a transit object. As an example, a user can request a service, such as a transportation or delivery service (e.g., food delivery, messenger service, food truck service, or product shipping) or an entertainment service (e.g., mariachi band, string quartet) using the system, and a service provider, such as a driver, food provider, band, etc. can communicate with the system and/or the user to arrange for the service. As described herein, a "user," an "end-user," a "requester," or a "customer" are invariably used to refer to individuals that are requesting or ordering a service using an application on his or her computing device. Also as described herein, a "provider," a "service provider," a "supplier," or a "vendor" are invariably used to refer to individuals or entities that can provide the service.

In some embodiments, once the system determines the most likely path of travel of a transit object on a transit system, the system can extrapolate additional position points along the most likely path of travel. A set of extrapolated points can then be wirelessly transmitted over a network to a client application stored and operated on an end-user's computing device (e.g., an observer device). The client application can use the set of extrapolated points and present a visualization of the trajectory of the transit object that accurately reflects the actual movement of the transit object to the user.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example tracking system, under an embodiment. In particular, FIG. 1 illustrates a system that can operate with or as part of another system that enables services to be arranged between parties (e.g., arrange a transport or a delivery between a requester of a service and a service provider). For example, the tracking system can provide a service for a requester by providing a visualization (as close to real-time) of available service providers within the area of the requester. In some examples, system 100 can periodically receive GPS data from one or more transit devices corresponding to one or more transit objects, determine the most likely path of travel for the one or more transit objects using the GPS data, and provide a set of extrapolated points of the most likely path of travel to an observer device. In this manner, the system can dynamically provide position information of a transit object to a user's computing device so that a smooth and accurate visualization of the trajectory of the transit object can be displayed to the user. A system such as described can be implemented in various contexts.

System 100 can dynamically provide position information for any type of object that can be in motion (e.g., a vehicle, a bicycle, a boat, a train, etc.) for any corresponding transit system (e.g., roads, walkways, railways, shipping routes, flight paths, etc.). In one example, system 100 can track bicycle messengers. Because bicycle messengers can ride on certain roads as well as through parks or open fields (but not on freeways or in rivers), the underlying corresponding transit system for bicycle messengers can include some roadways and other paths that vehicles cannot drive on (e.g., the corresponding transit system includes only possible avenues of travel).

In another example, system 100 can track the movement of trains on particular railways and railroads, i.e., a train's corresponding transit system and/or can track the movement of airplanes in flight patterns and paths, i.e., an airplane's corresponding transit system. The airplane transit system can also take into account no flight zones, for example, or typical paths between airports. System 100 can also track the movement of vehicles. In general, a vehicle can travel on most roadways and freeways, but only on certain bridges, for example, or only on selective streets through certain parks having streets. Although system 100 is not limited to vehicles and roadways, for simplicity purposes of this application, system 100 is described mainly with respect to vehicles that can travel on roadways, i.e., a vehicle's respective transit system.

System 100 includes a tracking service 110, a transit models database 140, a transit device interface 190, and an observer device interface 195. In some implementations, the tracking service 110 can also include a path of travel (POT) determination 120, a transit model determination 130, a position extrapolation 150, and a data store 160. The components of system 100 can combine to dynamically provide position information of one or more transit objects to one or more observer devices 180. For example, the components of system 100 can be implemented on network side resources, such as on one or more servers. System 100 can also be implemented through other computer systems in alternative architectures (e.g., peer-to-peer networks, etc.).

As an alternative or addition, some or all of the components of system 100 can be implemented on client machines or devices, such as through applications that operate on the transit devices 170 and/or observer devices 180. For example, a client application operating on a transit device and/or an observer device can execute to perform one or more of the processes described by the various components of system 100. System 100 can communicate over a network, via a network interface (e.g., wirelessly or using a wireline), to communicate with the one or more transit devices 170 and the one or more observer devices 180.

Each of the transit device interface 190 and the observer device interface 195 manages communications between system 100 and the corresponding devices over a network. In some implementations, each of the transit devices 170 can download, store, and operate an application that can interface with the transit device interface 190 in order to provide information to and/or receive information from system 100 via a cellular or Wi-Fi network. Similarly, each of the observer devices 180 can download, store, and operate an application (e.g., a different application than the application used by a customer, or the same application) that can interface with the observer device interface 195 in order to provide information to and/or receive information from system 100.

For example, the applications can include or use an application programming interface (API), such as an externally facing API, to communicate data with the respective device interfaces 190, 195. The externally facing API can provide access to system 100 via secure access channels over the network through any number of methods, such as web-based forms, programmatic access via restful APIs, Simple Object Access Protocol (SOAP), remote procedure call (RPC), scripting access, etc., while also providing secure access methods including key-based access to ensure system 100 remains secure and only authorized users, service providers, and/or third parties can gain access to system 100.

The tracking service 110 can receive, via the transit device interface 190, GPS data 171 from one or more transit devices 170. A transit device 170 can be a computing device that is located with a transit object (e.g., a vehicle, such as a sedan, a taxi cab, an SUV, etc.) so that its position corresponds to the position of the transit object. As the transit object moves, e.g., is driven along one or more roads, its actual position changes and is measured/identified by one or more sensors of the transit device 170 (e.g., a GPS component and a magnetometer). The GPS data 171 that is provided by the transit device 170 can correspond to position or GPS information of the transit device 170 determined at different instances in time (e.g., GPS snapshots).

For example, at time t=T1, the transit device 170 can be at a particular location or GPS point, identified by a latitude and a longitude (e.g., Lat1, Long1). The transit device 170 can provide the GPS data 171 that includes a latitude and longitude at time t=T1, as well as the time stamp of the GPS reading (e.g., the time stamp would be t=T1) and a GPS error amount to the POT determination 120. In some implementations, the GPS data 171 can also include a GPS bearing (or magnetometer bearing), or other information, such as nearby Wi-Fi networks, cellular network strength, etc. If the transit object is moving, at time t=T2, the transit device can be at a different location or GPS point, identified by a different latitude and longitude, Lat2 and Long2, respectively. This GPS data 171 is also provided to the tracking service 110 along with the time stamp (t=T2) and the GPS error amount at this particular GPS measurement. In this manner, the transit device 170 can periodically take GPS measurements of the current status or position of the transit object (e.g., every three seconds, every four seconds, etc.), and provide these measurements to the tracking service 110. In another example, the transit device 170 can provide GPS data 171 whenever new or updated GPS measurements are taken or are available.

In some implementations, as the transit object moves and provides updated GPS data 171 at different instances in time, the POT determination 120 can maintain a running history of GPS data for each transit object (e.g., for each transit device 170). For example, for each transit object, the GPS data 171 for that transit object can be continually added to a list or table of previously received GPS data. The POT determination 120 can include a data store or a buffer to store the GPS data 171 received from the transit devices 170. Using the GPS data 171 at different instances in time, the POT determination 120 attempts to identify which roadways or highways (when tracking vehicles, for example) the vehicle is actually moving on.

As the POT determination 120 receives the GPS data 171 at different instances in time (e.g., receives GPS snapshots), the POT determination 120 identifies one or more candidate points of a transit system that can correspond to a given GPS point. A candidate point is a point (having a latitude and a longitude reading) corresponding to a location on an underlying transit system. For example, a vehicle transit system, a candidate point can be a point that corresponds to a location on a street or at an intersection between streets. In order to identify one or more candidate points, the underlying transit system must be identified (based on what type of transit object the tracking service 110 is tracking).

In one implementation, the POT determination 120 queries 121 a transit model determination 130 for one or more appropriate transit models or spatial databases. The POT determination 120 can use the transit models and/or spatial databases to identify one or more candidate points and to determine the most likely path of travel for a particular transit object. The query 121 can identify the type of transit object (e.g., a bicycle, a vehicle, an airplane, etc.) that the tracking service 110 is to track. Based on the type of transit object, the transit model determination 130 can select, from a transmit models database 140, one or more selected transit models and/or spatial databases 123 that can be used by the POT determination 120.

For example, the transit models database 140 can store a variety of transit system spatial databases. Transit system spatial databases are queryable databases identifying different points (e.g., having a latitude and a longitude, and/or an altitude) along paths of transit which a given transit object can use, and information of how the different points connect with other points. Some transit system spatial databases can also include points identifying locations of interests or landmarks.

With respect to vehicles, a vehicle transit system spatial database can include points corresponding to locations on roadways, highways, freeways, etc., and other information related to roadways, such as intersections, one way streets, how the different roads and streets connect to each other, etc. Similarly, with respect to airplanes, an airplane transit system spatial database can include points corresponding to locations along flight paths and what points are boundaries for no flight zones, while for trains, a train transit system spatial database can include points corresponding to locations on railroads and railways, and where/how the railroads connect. Additional spatial databases can be created and/or added to the transit models database 140 as a result of real life updates and changes.

The POT determination 120 references a transit system spatial database in order to identify one or more candidate points corresponding to locations on the transit system. As a result, for a particular GPS point for a transit object, a candidate point can be a probable actual (or real-life) position of the transit device 170. This can be the best approximated position for the transit object that matches an actual position on the underlying transit system. The POT determination 120 identifies one or more candidate points because in many cases, a GPS measurement may not be perfectly accurate. This can be a result of bad GPS components of a computing device or a result of bad signals or interference when the GPS reading was taken. Because the GPS data 171 may not be accurate, the measured (and transmitted) latitude and longitude of a transit device 170 may not necessarily correspond to the actual position of the transit device 170. For example, due to the inconsistencies of a GPS measurement, a given GPS point for a vehicle can identify Lat1, Long1 (which corresponds to a building near a street) as the position of the transit device 170 at a time t=T1, but in reality, the transit device 170 can be positioned at Lat2, Long2 (which corresponds to a location on a street) at time t=T1. Using the position Lat2, Long2 would be more accurate in determining the most likely path of travel of the transit device 170 (especially if Lat1, Long 1 identified the vehicle to be on a different road than a road that the vehicle was actually traveling on).

Based on a selected spatial database or model 123, the POT determination 120 can identify, for each (or for some) of the GPS points received at different instances in time (e.g., GPS snapshots), one or more candidate points of the selected transit system. For example, if the tracking service 110 is tracking vehicles, the selected spatial database 123 can correspond to the vehicle transit system spatial database, which includes points corresponding to locations on roadways. By referencing the vehicle transit system spatial database, for a given GPS point (e.g., having a latitude and a longitude, a time stamp, a bearing, and an GPS error amount), the POT determination 120 identifies one or more candidate points (e.g., points corresponding to locations on roadways) that are nearby or close to the measured (and received) GPS point. The candidate point(s) can be identified by searching for points that are within a predetermined distance from the given GPS point at an instance. Depending on implementation, the predetermined distance can be configured or set by an administrator of system 100 or other users, or can correspond to a GPS error amount for a given GPS point that is provided by the respective GPS component of transit device.

As the transit object moves and provides updated GPS data 171 at different instances in time to the POT determination 120, the POT determination 120 continues to identify candidate point(s) for each GPS point at each instance in time (or as an alternative, not every GPS point, but for only selected GPS points). The POT determination 120 can then determine the most likely path of travel based on the identified candidate point(s) on the transit system. In one example, the POT determination 120 can query 121 the transit model determination 130 (at the same time it queried for the spatial database or at a different time) to select other transit models to determine the most likely path of travel. These transit models can use the identified one or more candidate points to make this determination. For example, other transit models stored in the database 140 include routing engines, physics engines, a hidden Markov model solver, or other models that can be used, individually or in combination, to determine the best or most likely paths of travel of one or more transit objects.

For example, a routing engine, a physics engine, and/or a hidden Markov model solver (or other models) can provide a mechanism that the POT determination 120 can use to select, from all (or many of) the possible paths of travel, a path of travel as being the most likely path of travel for a transit object. Based on the identified candidate points at each instance in time (corresponding to the each received GPS point), a routing engine and/or the physics engine, for example, can use the time stamps of the GPS points to generate timing distance and travel paths between two points in the transit system. Using this information, the routing engine and/or the physics engine can determine how long it would have (or should have) taken a typical vehicle driving at a particular speed on the road (e.g., based on the speed limit) to get from one GPS point to another GPS point (or one candidate point for a GPS point to another candidate point for a subsequent GPS point). This can provide a better indication as to which path of travel is the most likely travel path of the vehicle (as compared to other travel paths). In another example, a hidden Markov model solver (or other Markov models) can also be used by the POT determination 120 to determine the most likely path of travel of the transit object.

Because the identified candidate points correspond to only possible positions of the transit device 170, the POT determination 120 considers only possible avenues of travel for the particular type of transit object (e.g., roads for vehicles, roads and walkways for bicycles, railroads for trains) in determining the most likely path of travel. In the case of tracking vehicles, the most likely path of travel can include, for example, Road 1 to Road 2 to Road 3, etc., while continuing to stay on these roads (e.g., cannot jump between roads). In this manner, the GPS data 171 of the transit objects can be matched to the underlying transit system and the most likely path of travel can be determined for each of the transit objects.

In some implementations, the determined most likely path of travel 125 can continue to be stored in a data store 160 as the POT determination 120 continues to process the GPS data 171 (e.g., as the GPS data is continually or periodically received from the transit devices 170). The POT determination 120 can continue to identify one or more candidate points and determine a most likely path of travel until the transit device 170 stops providing the GPS data 171 (e.g., shuts off or closes/logs out of the application) or until other triggers are received. For example, if the transit device 170 is performing a service (e.g., is unavailable) or is out of commission, the transit device 170 can stop providing the GPS data 171 to the tracking service 110.

The position extrapolation 150 can generate position data of a transit object based on the determined most likely path of travel 125. As an addition or an alternative, the position extrapolation 150 can retrieve the stored most likely path of travel 151 from the data store 160. Using the most likely path of travel 151 determined by the POT determination 120, the position extrapolation 150 can extrapolate additional position points along the most likely path of travel.

For example, if a GPS point or candidate point at time t=T1 is determined to be a point along the most likely path of travel, and four seconds later at time t=T2, another GPS point or candidate point is determined to be a point along the most likely path of travel, additional extrapolated data points can be generated along the most likely path of travel in between the points at t=T1 and t=T2. For each of the extrapolated points, a corresponding extrapolated time stamp can also be generated. Optionally, the bearing or heading can also be included with each extrapolated data point. By generating extrapolated points, additional points that are closer together in time (e.g., one second, a half of a second, or a third of a second, etc., as compared to four seconds) can be provided to the observer device 180 (via the observer device interface 195) so that a visualization of the movement of the transit device can be displayed more smoothly to a user.

The extrapolated data 155 is provided to the observer device(s) 180 via the observer device interface 195. An application running on the observer device 180 (and communicating with system 100) can use the extrapolated data 155 to display (e.g., as part of a map) the location and trajectory of transit objects in real-time (or as close to real-time). In the example of vehicles, because the extrapolated data 155 (which can also include the selected GPS point or candidate point) corresponds to actual locations on roads, highways, and freeways, a graphic (e.g., an image of a vehicle) that represents the transit object can be animated to move on the appropriate roads on the map. This is done by matching the positions identified in the extrapolated data 155 to the underlying map displayed on the user's observer device 180. In this manner, a smooth visualization of the trajectory of the transit object that accurately reflects the actual movement of the transit object can be presented to a user.

The position extrapolation 150 can also receive timing information 181 (via the observer device interface 195) from one or more observer devices 180 in order to adjust or control the timing of the delivery of extrapolated data 155 and/or control the amount of extrapolated data to be provided to individual observer devices 180. The observer devices 180 can typically operate off different clocks. For example, observer device 180-1 can be off by ten seconds from observer device 180-2. Similarly, transit devices 170 can also operate off different clocks. Despite the fact that the clocks of the devices are not in sync, system 100 provides for a synchronization-free visualization service so that the transit devices 170 and the observer devices 180 do not have to be in sync in order for position information to be accurately provided to the observer devices 180.

The position extrapolation 150 can provide a window of extrapolated points 155 (e.g., a set of extrapolated points 155) that span a particular duration of time (e.g., ten seconds) for a transit object. This window of extrapolated points 155 can have a start time and an end time (which corresponds to a start point and an end point along the determined most likely path of travel). A set of extrapolated points 155 (e.g., that spans a duration of ten seconds, or fifteen seconds, etc.) can be beneficial in situations where the observer device 180 loses a signal or cannot receive subsequent sets of extrapolated points 155 from the tracking service 110. The application running on the observer device 180 can continue to display visualization of the transit object for a time until a signal is re-established and additional extrapolated data 155 is received. The position extrapolation 150 can continue to periodically check/receive the timing information 181 of the individual observer devices 180 to adjust or control the timing of the delivery of extrapolated data 155 and/or control the amount of extrapolated data to be provided to individual observer devices 180. Additionally, based on the timing information 181 of an observer device 180, the position extrapolation 150 can also determine a delay (e.g., determine how far back in the past to use and provide position points of a transit object) and provide a window of extrapolated points 155 of a transit object to the particular observer device 180 to account for clock discrepancies.

In some implementations, when the position extrapolation 150 transmits an additional window of extrapolated data 155 to the observer device 180, this additional window can overlap (e.g., some of the subsequently transmitted extrapolated points can share points previously transmitted) the previously transmitted window. In such a case, the application running on the observer device 180 can replace or modify the redundant data (e.g., has two data points at the same time t=T5) with the more recently received extrapolated data, and add/append the other more recently received extrapolated data 155 to the previously received extrapolated data 155. In this manner, although segments of data can be received at discrete times, the visualization of the transit object can be seamless on the observer device 180.

The tracking service 110 (via the position extrapolation 150) can also maintain a database (e.g., using the data store 160 or other data stores) of user accounts, and can monitor the current location of the transit devices 170 and the observer devices 180. In some examples, only extrapolated data 155 of transit objects that are within a certain area or predetermined distance from an observer device 180 will be transmitted to the observer device 180 (e.g., within a particular distance, such as 15 mile radius or 20 minutes distance from the observer device 180, or within a city limit or metropolitan area that the observer device 180 is currently located in, etc.).

The tracking service 110 also provides a fail-safe in situations where one or more components of the tracking service 110 and/or system 100 fail. For example, the tracking service 110 can continue to receive raw GPS data 171 from the transit device(s) 170 and directly provide the raw GPS data to the observer device(s) 180 without processing (e.g., without fitting the GPS data to an underlying transit system) the GPS data. The applications running on the observer devices 180 can use the raw GPS data to still provide an estimated position of the transit object at the different instances in time. Similarly, if for example, some transit devices are operating off an older application that does not provide GPS error and/or cannot be mapped to a transit system, the raw GPS points can still be provided to system 100, which is then (without being processed) transmitted to the observer device(s) 180. In this manner, the tracking service 110 is horizontally scalable by enabling different components of system 100 to operate on any of different devices and/or operate even when one or more other components fail.

In some variations, some of the components that are described in system 100 can be provided as being individual components or as being part of the same component. For example, the transit model determination 130 can be provided as a part of the POT determination 120 or the position extrapolation 150 can be provided as a part of the POT determination 120. Logic can be implemented with various applications (e.g., software) and/or with hardware of a computer system that implements system 100.

Methodology

Figure 2:
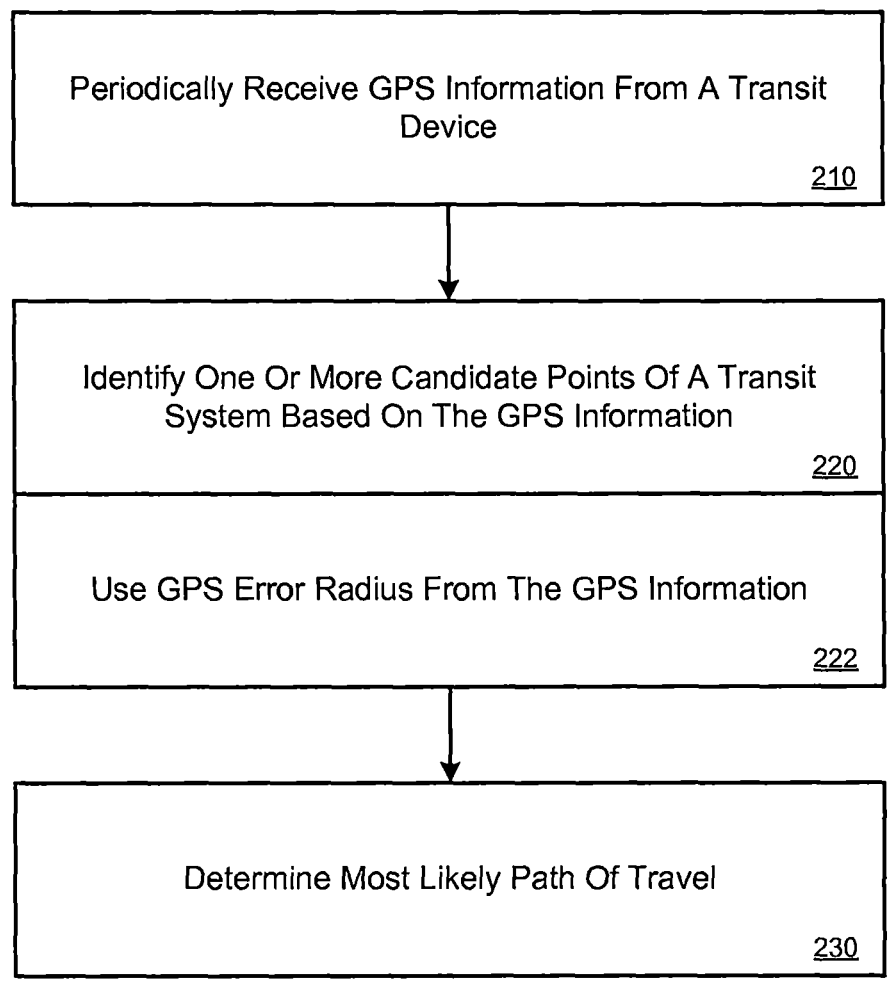
FIG. 2 illustrates an example method for determining a path of travel of a transit object, according to an embodiment.

FIG. 2 illustrates an example method for determining a path of travel of a transit object, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

The tracking system periodically receives GPS information from one or more transit devices (step 210). The GPS information provided by a transit device can include a latitude and longitude of the transit device, a time stamp, a bearing, and a GPS error amount at a given instances in time. The GPS component of a transit device can determine the GPS error for each measured GPS data (e.g., at each given instance in time). In this manner, as the transit device (and the corresponding transit object) moves and changes position, the transit device can continue to provide the GPS information to the tracking system to indicate new and/or updated positions.

Figure 3:
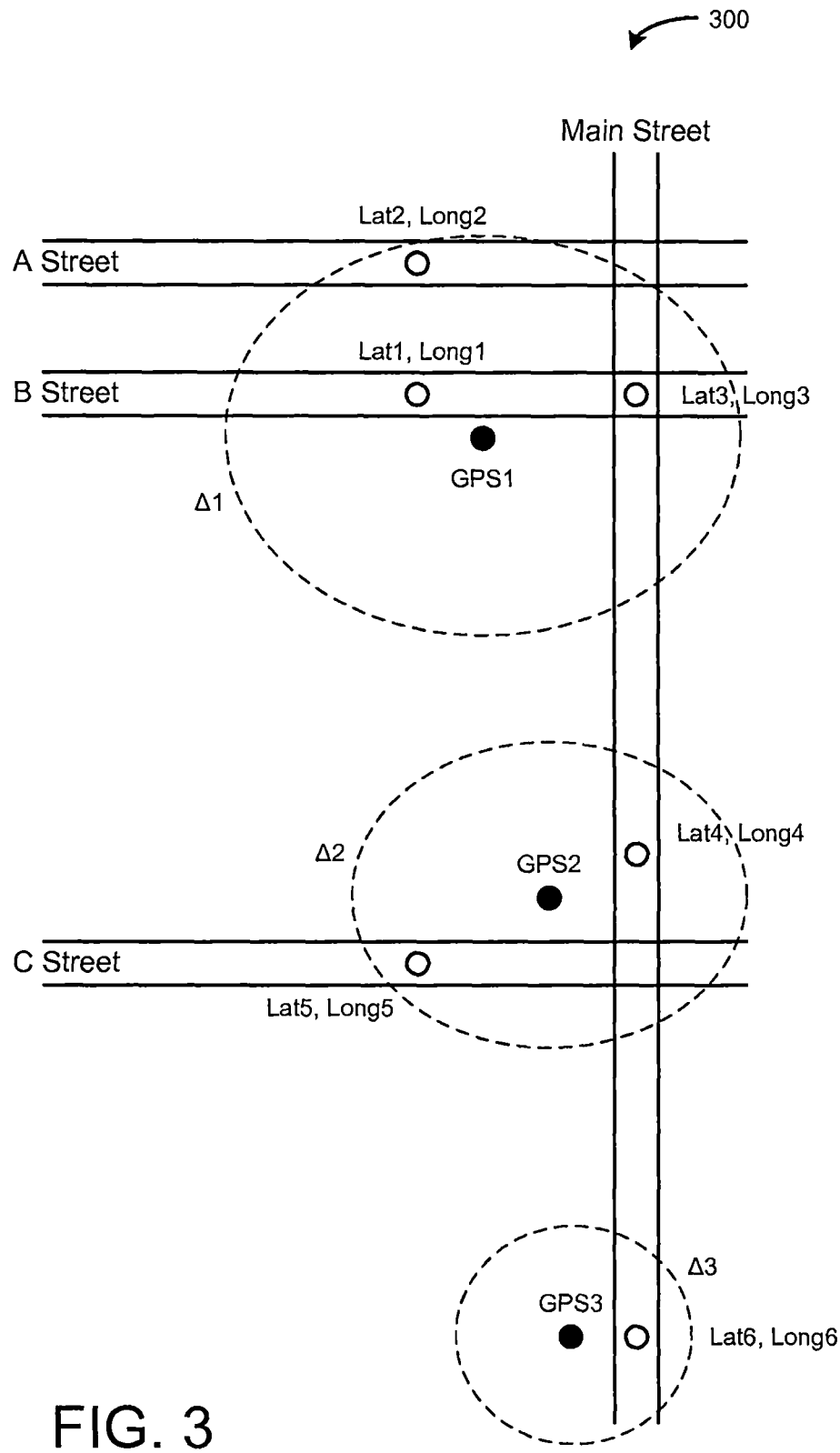
FIG. 3 illustrates an example model illustrating a part of the example method of FIG. 2, according to an embodiment.

For example, referring to FIG. 3 for illustrative purposes, the tracking system (as described in FIG. 1) is tracking the movement of one or more vehicles (transit objects). As a result, the underlying transit system corresponds to a vehicle transit system. In this case, at time t=T1, a transit device provides GPS information identifying its position GPS1 having a latitude and a longitude, a GPS error amount $\Delta 1$, and a time stamp t=T1. In this case, although the transit device can be traveling on a road (e.g., the transit object can be a vehicle), due to the GPS measurement inaccuracies, GPS1 may not necessarily be shown to be on the road. Similarly, at time t=T2, the transit device provides GPS information identifying its position GPS2 having a latitude and a longitude, a GPS error amount $\Delta 2$, and a time stamp t=T2, and at time t=T3, the transit device provides GPS information identifying its position GPS3 having a latitude and a longitude, a GPS error amount $\Delta 3$, and a time stamp t=T3, and so forth. The transit device can continue to provide GPS information as it continues to move. For each of the GPS information at a given instance, the bearing information can also be included (e.g., south, southeast, etc.).

Using the GPS information, the tracking system can identify, for each of the GPS points at a given instance, one or more candidate points of a transit system (step 220). The candidate points can be identified by referencing one or more transit system spatial databases and determining which points are nearby or close to the measured (and received) GPS point. In this manner, the inaccuracies of the GPS measurements can be accounted for in determining the most likely path of travel. The candidate point(s) can be identified by searching for points (each having a latitude and a longitude) that are within a predetermined distance or within a GPS error amount from the given GPS point at an instance (sub-step 222). The GPS error amount can also vary from point to point as a result of the varying signal quality and/or different interferences at different locations, and can be represented as an ellipse (e.g., where the latitude error and the longitude error can be different) or as a circle (e.g., where the latitude error and the longitude error are equal). As an alternative or an addition, the GPS error amounts can be normalized for each GPS point (see GPS error amount $\Delta 3$, which has been normalized to be represented as a circle) in order to perform a search of candidate points within a radius (e.g., a normalized GPS error amount).

Referring again to the example in FIG. 3, the tracking system has selected a vehicle transit system spatial database from a transit models database (e.g., because the tracking system is tracking the movement of vehicles in this example). For each GPS point, the tracking system can identify one or more candidate points corresponding to locations on roadways, highways, freeways, etc., to determine the actual roadway the transit device is actually on. For example, for the GPS point GPS1 at time t=T1, three candidate points having latitudes and longitudes, Lat1, Long1, Lat2,Long2, and Lat3,Long3, respectively, have been identified by the tracking system. In this case, GPS1 has a GPS error amount $\Delta 1$ that is larger than the GPS error amounts $\Delta 2$ and $\Delta 3$, thereby encompassing a larger search area for candidate points. As a result, the tracking system identifies that the actual position of the transit device can potentially be on A Street, B Street, and the intersection of B Street and Main Street. For GPS2 at time t=T2, two candidate points having latitudes and longitudes, Lat4, Long4, and Lat5, Long5 have been identified, respectively, and for GPS3 at time t=T3, only one candidate point having latitude and longitude, Lat6,Long6 has been identified.

Based on the identified candidate points (and the corresponding time stamps), the tracking system can determine the most likely path of travel of the transit object on the transit system (step 230). For example, the tracking system can apply or use one or more transit models, such as routing engines, physics engines, a hidden Markov model solver, or other models, individually or in combination, to determine the best or most likely paths of travel of the transit object. Referring to FIG. 3, the tracking system can determine, for example, that the most likely path of travel of the vehicle (the transit object) is from the following positions: Lat1, Long1 to Lat4,Long4, and to Lat6,Long6 (see also FIG. 4B).

Other paths of travel can be possible based on the candidate points selected. For example, the transit device could have traveled from Lat2,Long2 to Lat4,Long4. However, the transit models can take into account the travel times based on the time stamps provided with each GPS point at a given instance in time, in order to better determine the more likely path of travel between Lat1,Long1 to Lat4,Long4 or Lat2, Long2 to Lat4,Long4. For example, the travel time from Lat2,Long2 to Lat4,Long4 would be much longer than the alternative. Similarly, Lat5,Long5 on C Street is also a point along a possible path of travel. Again, using the transit models, such as a hidden Markov model solver, the tracking system can determine that the candidate point Lat5,Long5 is unlikely (based on probabilities, timing, etc.) as compared to Lat4,Long4.

Figure 4A:
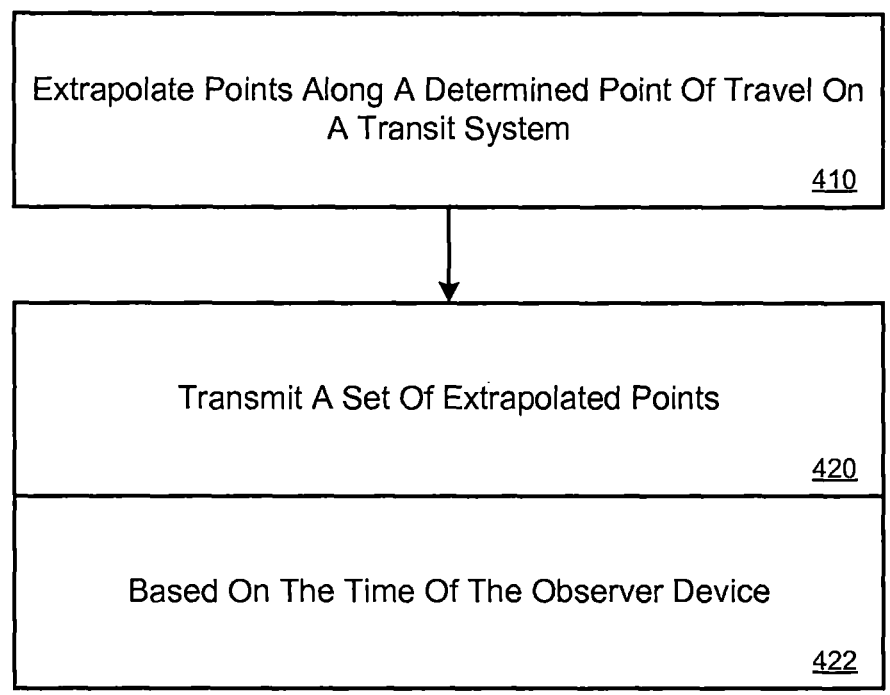
FIG. 4A illustrates an example method for providing position information of a transit object to a computing device, under an embodiment.

FIG. 4A illustrates an example method for providing position information of a transit object to a computing device, under an embodiment. A method such as described by an embodiment of FIG. 4 can be implemented using, for example, components described with an embodiment of FIG. 1. Accordingly, references made to elements of FIG. 1 are for purposes of illustrating a suitable element or component for performing a step or sub-step being described. In some implementations, step 410 of FIG. 4A can be automatically performed in response to the most likely path of travel being determined (e.g., after step 230 of FIG. 2).

The tracking system can extrapolate additional position points along the most likely path of travel (e.g., in addition to the GPS point or candidate point determined to be on the most likely path of travel) (step 410). For example, referring to FIG. 4B, if a candidate point Lat1,Long1 of the GPS point GPS1 at time t=T1 is determined to be a point along the most likely path of travel (e.g., the darker line from B Street to Main Street), and a duration of time later (e.g., five seconds) at time t=T2, the candidate point Lat4,Long4 of GPS point GPS2 at time t=T2 is determined to be another point along the most likely path of travel, additional extrapolated data points (marked by X's) can be generated along the most likely path of travel in between the points at t=T1 and t=T2. Additional points can be extrapolated as the most likely path of travel continues to be determined. For example, points can be extrapolated next between Lat4,Long4 and Lat6, Long6. For each of these extrapolated points (marked with X's), having a latitude and a longitude, a corresponding extrapolated time stamp can also be generated. A bearing or heading can also be included with each extrapolated data point.

Figure 4B:
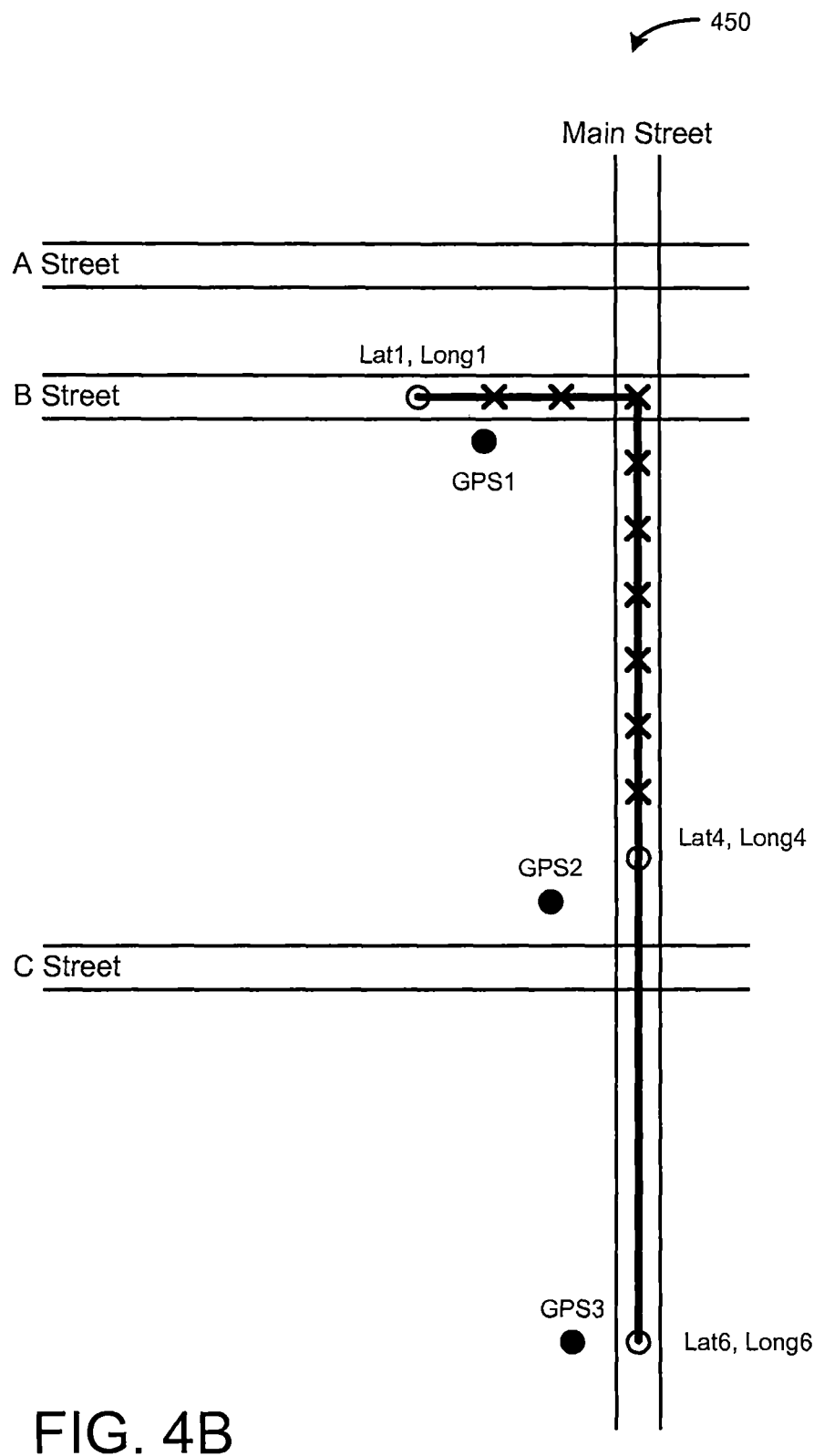
FIG. 4B illustrates an example model illustrating a part of the example method of FIG. 4A, according to an embodiment.

The extrapolated data is transmitted to one or more observer devices (step 420). An application running on the observer device can use the extrapolated data to display (e.g., as part of a map) the location and trajectory of transit objects in real-time (or as close to real-time). In the example of vehicles as shown in FIGS. 3 and 4B, because the extrapolated data (which can also include the selected GPS point or candidate point) corresponds to actual locations on roads, highways, and freeways, a graphic (e.g., an image of a vehicle) that represents the transit object can be animated to move on the appropriate roads on the map. This is done by matching the positions identified in the extrapolated data to the underlying map displayed on the user's observer device. In this manner, a smooth visualization of the trajectory of the transit object that accurately reflects the actual movement of the transit object can be presented to a user.

In one example, the tracking system can also determine or receive timing information from one or more observer devices. Based on the timing information, the tracking system can adjust or control the timing of the delivery of extrapolated data and/or control the amount of extrapolated data to be provided to individual observer devices (sub-step 422). Based on the timing information of an observer device, the tracking system can also determine a delay (e.g., determine how far back in the past to use and provide position points of a transit object) and provide a set of extrapolated points of a transit object to the particular observer device to account for clock discrepancies between the system and the observer device.

User Interface Example

Figure 5:
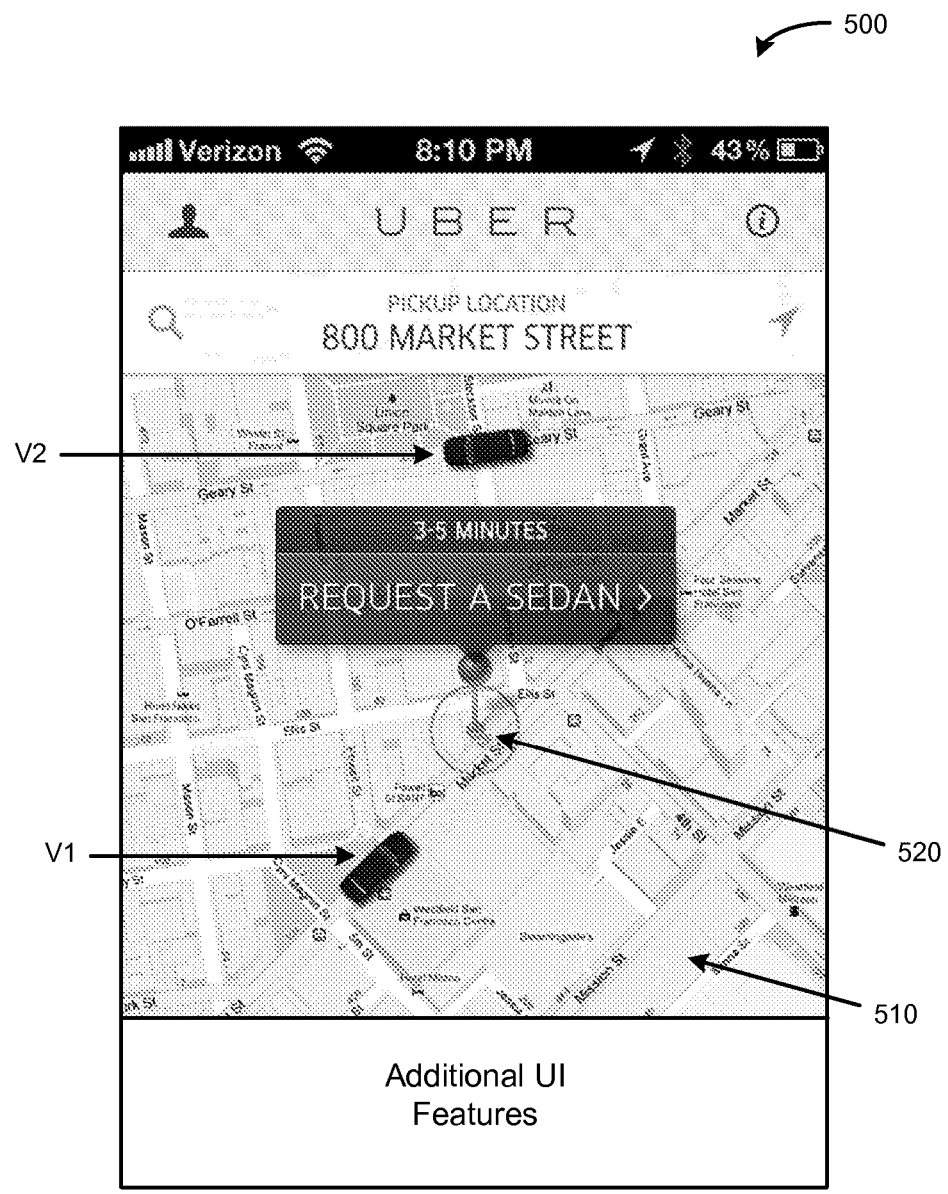
FIG. 5 illustrates an example user interface illustrating a trajectory of a transit object that is displayed on a computing device, under an embodiment.

FIG. 5 illustrates an example user interface illustrating a trajectory of a transit object that is displayed on a computing device, under an embodiment. The user interface 500 illustrates a user interface that can be provided by a service application running or being operated on an observer device (e.g., a smart phone) and/or a transit device (in some implementations). In one implementation, the user interface 500 includes a map 510 and an indicator 520 representing the current location of the observer device. In the example shown, the user interface 500 is provided at least in part by a transport service application that a user can use to request for a transport service to be arranged between the user of the observer device and available service providers.

In some implementations, the tracking system can communicate with a fleet of vehicles that can be arranged to provide services for requesters. The GPS data can be received for the fleet of vehicles (e.g., multiple transit objects) and processed by the tracking system. The tracking system can then provide position information (e.g., extrapolated data) of selected transit objects to the respective observer devices based on the geographic location of the observer devices and the transit objects. In this manner, a user of an observer device can see the location and movements of the transit objects in his or her area (and not of objects that he or she does not care about in other areas that are too far to service him or her) to make a more informed decision in requesting a service.

The user interface 500 can provide a real-time (or close to real-time) visualization of the position and trajectory of one or more transit objects (e.g., in this example, transport service providers) that accurately reflect the actual position and movement of the transit object to a user. Using the extrapolated position data (as discussed with respect to FIGS. 1-4B), the application can present a graphic image of a vehicle, V1, on the map 510. The graphic image V1 can move along the road (e.g., Market Street) in the manner accurately reflecting the movement of the transit object in real life. Similarly, a second graphic image of a vehicle, V2, can also be presented on the map 510 and dynamically animated accordingly.

According to an implementation, the graphic images can also vary depending on the transit object. The graphic images can match the type of vehicle, for example, to provide an accurate depiction of the vehicle being a sedan, an SUV, a limousine, etc. Similarly, for other transit objects (e.g., bicycles, trains, airplanes, boats, etc.) on an underlying transit system, respective graphic images can also be presented. In addition, the graphic images can also face (e.g., point) in the correct direction to match the bearing and trajectory of the actual transit object. In the example provided in FIG. 5, V1 is shown with the front of the device driving towards the user on Market St, whereas V2 is shown with the front of the device driving west on Geary St. In this manner, an accurate depiction of the real-time and actual movement of transit objects can be provided to users in accordance with a service.

Hardware Diagrams

Figure 6:
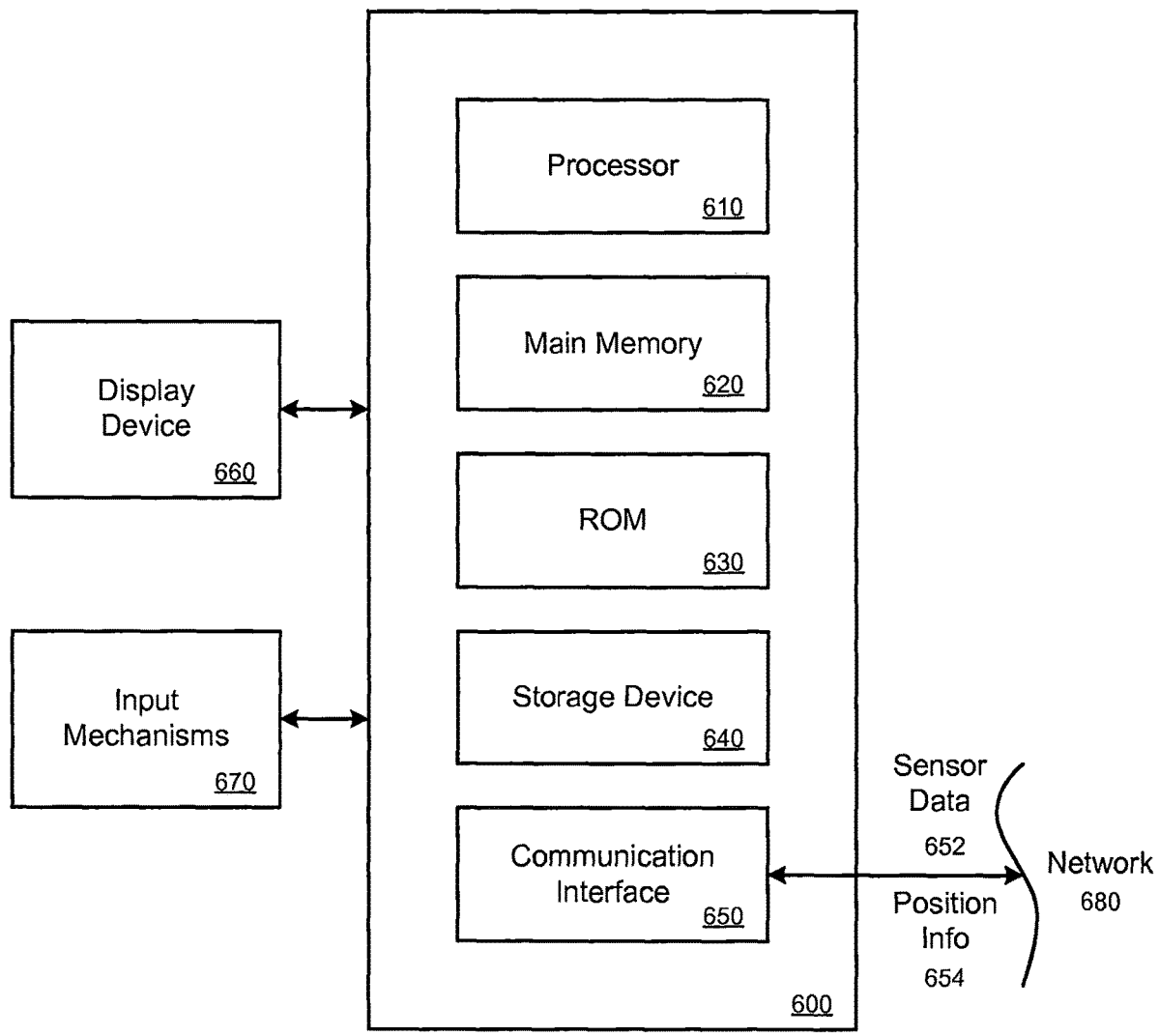
FIG. 6 is a block diagram that illustrates a computer system upon which embodiments described herein may be implemented.

FIG. 6 is a block diagram that illustrates a computer system upon which embodiments described herein may be implemented. For example, in the context of FIG. 1, system 100 may be implemented using a computer system such as described by FIG. 6. System 100 may also be implemented using a combination of multiple computer systems as described by FIG. 6.

In one implementation, computer system 600 includes processing resources 610, main memory 620, ROM 630, storage device 640, and communication interface 650. Computer system 600 includes at least one processor 610 for processing information and a main memory 620, such as a random access memory (RAM) or other dynamic storage device, for storing information and instructions to be executed by the processor 610. Main memory 620 also may be used for storing temporary variables or other intermediate information during execution of instructions to be executed by processor 610. Computer system 600 may also include a read only memory (ROM) 630 or other static storage device for storing static information and instructions for processor 610. A storage device 640, such as a magnetic disk or optical disk, is provided for storing information and instructions.

The communication interface 650 can enable the computer system 600 to communicate with one or more networks 680 (e.g., cellular network) through use of the network link (wireless or wireline). Using the network link, the computer system 600 can communicate with one or more computing devices, and one or more servers. In some variations, the computer system 600 can be configured to receive sensor data (e.g., such as GPS data) from one or more transit devices (e.g., belonging to service providers) via the network link. The sensor data 652 can be processed by the processor 610 and can be stored in, for example, the storage device 640. The processor 610 can process the sensor data 652 of a transit device in order to determine a most likely path of travel of a transit object corresponding to the transit device. Extrapolated position information 654 can be transmitted to one or more observer devices over the network 680 to enable an application running on the observer device to use the position information 654 to present a visualization of the actual movement of the transit object.

Computer system 600 can also include a display device 660, such as a cathode ray tube (CRT), an LCD monitor, or a television set, for example, for displaying graphics and information to a user. An input mechanism 670, such as a keyboard that includes alphanumeric keys and other keys, can be coupled to computer system 600 for communicating information and command selections to processor 610. Other non-limiting, illustrative examples of input mechanisms 670 include a mouse, a trackball, touch-sensitive screen, or cursor direction keys for communicating direction information and command selections to processor 610 and for controlling cursor movement on display 660.

Examples described herein are related to the use of computer system 600 for implementing the techniques described herein. According to one embodiment, those techniques are performed by computer system 600 in response to processor 610 executing one or more sequences of one or more instructions contained in main memory 620. Such instructions may be read into main memory 620 from another machine-readable medium, such as storage device 640. Execution of the sequences of instructions contained in main memory 620 causes processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
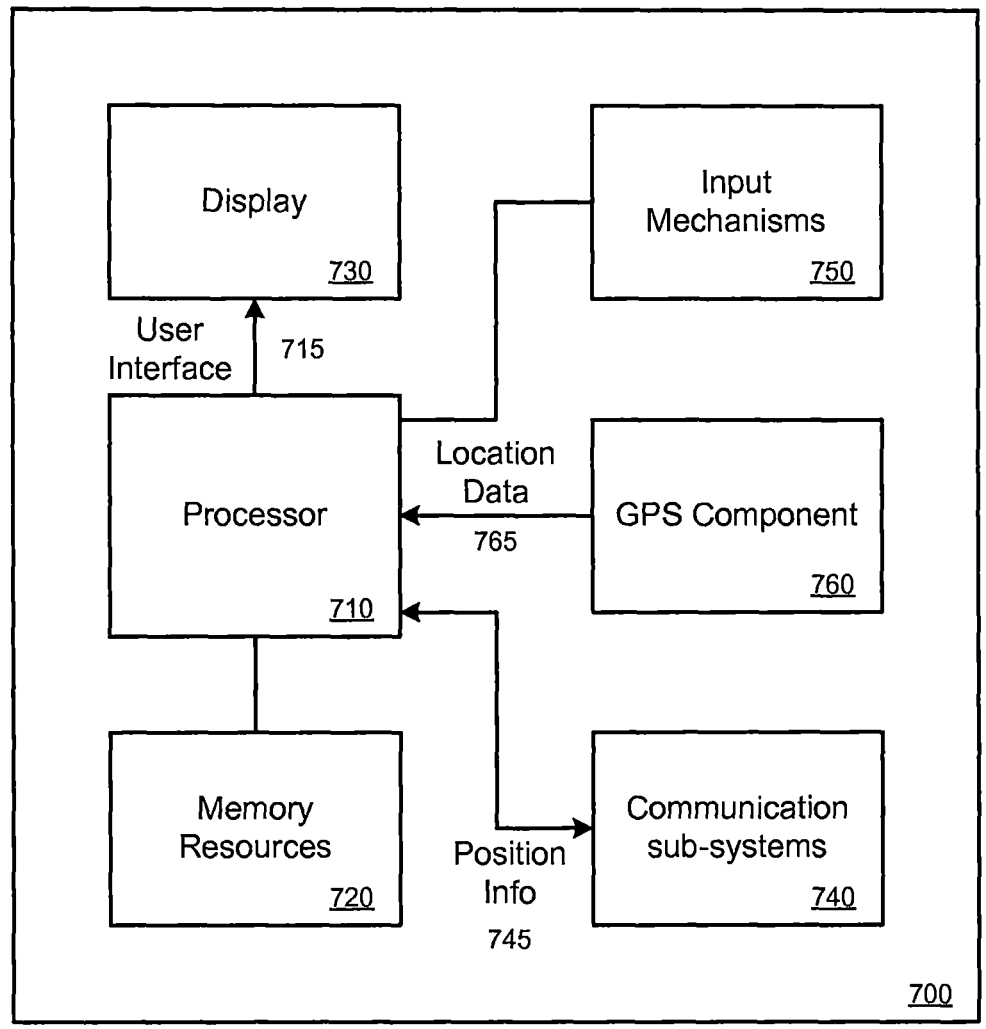
FIG. 7 is a block diagram that illustrates a mobile computing device upon which embodiments described herein may be implemented.

FIG. 7 is a block diagram that illustrates a mobile computing device upon which embodiments described herein may be implemented. In one embodiment, a computing device 700 may correspond to a mobile computing device, such as a cellular device that is capable of telephony, messaging, and data services. The computing device 700 can correspond to each of a transit device and an observer device. Examples of such devices include smartphones, handsets or tablet devices for cellular carriers. Computing device 700 includes a processor 710, memory resources 720, a display device 730 (e.g., such as a touch-sensitive display device), one or more communication sub-systems 740 (including wireless communication sub-systems), input mechanisms 750 (e.g., an input mechanism can include or be part of the touch-sensitive display device), and one or more location detection mechanisms (e.g., GPS component) 770. In one example, at least one of the communication sub-systems 740 sends and receives cellular data over data channels and voice channels.

The processor 710 is configured with software and/or other logic to perform one or more processes, steps and other functions described with implementations, such as described by FIGS. 1-5, and elsewhere in the application. Processor 710 is configured, with instructions and data stored in the memory resources 720, to operate a service application as described in FIGS. 1-5. For example, instructions for operating the service application in order to display user interfaces, such as a user interface described in FIG. 4, can be stored in the memory resources 720 of the computing device 700.

From the viewpoint of a service provider, a service provider operating a transit device (such as a computing device 700) can operate a service application so that sensor data, such as location/position data 765, can be determined from the GPS component 770. This location/position data 765 can then be wirelessly transmitted to the system via the communication sub-systems 740. From the viewpoint of an end-user, a user can operate the service application in order to receive position information 745 of one or more transit objects from the system (via the communication sub-systems 740).

The processor 710 can provide content to the display 730 by executing instructions and/or applications that are stored in the memory resources 720. In some examples, one or more user interfaces 715 can be provided by the processor 710, such as a user interface for the service application, based at least in part on the received position information 745 of the one or more transit objects. While FIG. 7 is illustrated for a mobile computing device, one or more embodiments may be implemented on other types of devices, including full-functional computers, such as laptops and desktops (e.g., PC).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for providing position information of a transit object to a computing device, the method being performed by at least one processor of a computing system and comprising:

receiving, from a service provider computing device, a first GPS location point of a transit object, including a first time stamp, and a second GPS location point of the transit object, and including a second time stamp, each OPS location point corresponding to a latitude and a longitude coordinate of the transit object;

identifying, for the first GPS location point, a first set of candidate location points of a transit system, and for the second GPS location point, a second set of candidate location points of the transit system;

determining a path of travel of the transit object between a first candidate location point of the first set and a second candidate location point of the second set, wherein determining the path of travel of the transit object between the first and second candidate location points is based at least in part on the first OPS location point, the second GPS location point, the first time stamp, and the second time stamp;

determining, from the path of travel, one or more extrapolated location points positioned between the first candidate location point from the first set and the second candidate location point from the second set;

transmitting, to a requester computing device as the service provider operates the transit object to arrive at a service location, the one or more extrapolated location points and at least the first candidate location point or the second candidate location point; and providing, as the service provider operates the transit object to arrive at the service location, a graphic representation of the transit object in a map user interface, wherein movement of the transit object along a trajectory toward the service location is animated based on the one or more extrapolated location points and at least the first candidate location point or the second candidate location point.

2. The method of claim 1, wherein identifying the first set and the second set of candidate location points of the transit system includes referencing a transit spatial database of a transit system.

3. The method of claim 2, wherein each of at least one candidate location point of the first set and at least one candidate location point of the second set corresponds to a location point on a path of travel identified in the transit spatial database.

4. The method of claim 1, wherein determining the path of travel includes using the first and second time stamps of the first and second GPS location points with at least one of a routing engine, a physics engine, or a hidden Markov model solver.

5. The method of claim 1, wherein determining the one or more extrapolated location points along the path of travel includes determining an extrapolated time stamp for each of the one or more extrapolated location points.

6. The method of claim 1, wherein transmitting the one or more extrapolated location points to the requester computing device includes determining a current time associated with the requester computing device and transmitting the one or more extrapolated location points based on the current time.

7. The method of claim 1, wherein the transit object is one of a vehicle, an airplane, a bicycle, a motorcycle, a train, a light-rail vehicle, a helicopter, or a ship.

8. The method of claim 1, wherein the first set of candidate location points and the second set of candidate location points are identified based on a first GPS error amount and a second GPS error amount, respectively.

9. A computer system to provide position information of a transit object to a computing device, the computer system comprising:
 memory resources storing instructions;
 a network interface; and
 at least one processor, coupled to the memory resources and the network interface, to execute the instructions, wherein the instructions, when executed by the at least one processor, cause the system to:
 receive, from a service provider computing device, a first GPS location point of a transit object, including a first time stamp, and a second GPS location point of the transit object, and including a second time stamp, each GPS location point corresponding to a latitude and a longitude coordinate of the transit object;
 identify, for the first GPS location point, a first set of candidate location points of a transit system, and for the second GPS location point, a second set of candidate location points of the transit system;
 determine a path of travel of the transit object between a first candidate location point of the first set and a second candidate location point of the second set, wherein determining the path of travel of the transit object between the first and second candidate location points is based at least in part on the first GPS location point, the second GPS location point, the first time stamp, and the second time stamp; determine, from the path of travel, one or more extrapolated location points positioned between the first candidate location point from the first set and the second candidate location point from the second set; transmit, to a requester computing device as the service provider operates the transit object to arrive at a service location, the one or more extrapolated location points and at least the first candidate location point or the second candidate location point; and instruct, as the service provider operates the transit object to arrive at the service location, the requester computing device to animate a graphic representation of the transit object in a map user interface, including animating movement of the transit object along a trajectory toward the service location based on the one or more extrapolated location points and at least the first candidate location point or the second candidate location point.

10. The system of claim 9, wherein identifying the first set and the second set of candidate location points of the transit system includes referencing a transit spatial database of a transit system.

11. The system of claim 10, wherein each of at least one candidate location point of the first set and at least one candidate location point of the second set corresponds to a location point on a path of travel identified in the transit spatial database.

12. The system of claim 9, wherein determining the path of travel includes using the first and second time stamps of the first and second GPS location points with at least one of a routing engine, a physics engine, or a hidden Markov model solver.

13. The system of claim 9, wherein determining the one or more extrapolated location points along the path of travel includes determining an extrapolated time stamp for each of the one or more extrapolated location points.

14. The system of claim 9, wherein the transit object is one of a vehicle, an airplane, a bicycle, a motorcycle, a train, a light-rail vehicle, a helicopter, or a ship.

15. The system of claim 9, wherein the first set of candidate location points and the second set of candidate location points are identified based on a first GPS error amount and a second GPS error amount, respectively.

16. A non-transitory computer readable medium storing instructions that, when executed by one or more processors of a system, cause the system to:
 receive, from a service provider computing device, a first GPS location point of a transit object, including a first time stamp, and a second GPS location point of the transit object, and including a second time stamp, each GPS location point corresponding to a latitude and a longitude coordinate of the transit object; identify, for the first GPS location point, a first set of candidate location points of a transit system, and for the second GPS location point, a second set of candidate location points of the transit system;
 determine a path of travel of the transit object between a first candidate location point of the first set and a second candidate location point of the second set, wherein determining the path of travel of the transit object between the first and second candidate location points is based at least in part on the first GPS location point, the second GPS location point, the first time stamp, and the second time stamp; determine, from the path of travel, one or more extrapolated location points positioned between the first candidate location point from the first set and the second candidate location point from the second set; transmit, to a requester computing device as the service provider operates the transit
object to arrive at a service location, the one or more extrapolated location points and at least the first candidate location point or the second candidate location point; and
provide, as the service provider operates the transit object to arrive at the service location, a graphic representation of the transit object in a map user interface, wherein movement of the transit object along a trajectory toward the service location is animated based on the one or more extrapolated location points and at least the first candidate location point or the second candidate location point.

17. The non-transitory computer readable medium of claim 16, wherein identifying the first set and the second set of candidate location points of the transit system includes referencing a transit spatial database of a transit system.

18. The non-transitory computer readable medium of claim 16, wherein determining the path of travel includes using the first and second time stamps of the first and second GPS location points with at least one of a routing engine, a physics engine, or a hidden Markov model solver.

19. The non-transitory computer readable medium of claim 16, wherein transmitting the one or more extrapolated location points to the requester computing device includes determining a current time associated with the requester computing device and transmitting the one or more extrapolated location points based on the current time.

20. The non-transitory computer readable medium of claim 16, wherein the first set of candidate location points and the second set of candidate location points are identified based on a first GPS error amount and a second GPS error amount, respectively.

* * * * *

UNITED STATES PATENT AND TRADEMARK OFFICE
CERTIFICATE OF CORRECTION

PATENT NO. : 10,935,382 B2
APPLICATION NO. : 16/247958
DATED : March 2, 2021
INVENTOR(S) : Holden et al.

Page 1 of 1

It is certified that error appears in the above-identified patent and that said Letters Patent is hereby corrected as shown below:

On the Title Page

Item (56), in Column 2, under "U.S. Patent Documents", Line 2, after "Polivka" insert -- et al. --.

In the Claims

In Column 16, in Claim 1, Line 49, delete "OPS" and insert -- GPS --, therefor.

In Column 16, in Claim 1, Line 61, delete "OPS" and insert -- GPS --, therefor.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*